United States Patent [19]
Bettiol

[11] 3,978,741
[45] Sept. 7, 1976

[54] VARIABLE-PROFILE CAM, ESPECIALLY FOR A REPRODUCING MACHINE

[75] Inventor: Bruno Bettiol, Quincy-Voisins, France

[73] Assignee: Essilor International "Cie Generale D'Optique", Joinville-le-Pont, France

[22] Filed: Nov. 26, 1974

[21] Appl. No.: 527,296

[30] Foreign Application Priority Data
Dec. 4, 1973 France .............................. 73.43129

[52] U.S. Cl............................. 74/568 R; 74/568 FS
[51] Int. Cl.[2] ........................................ F16H 53/04
[58] Field of Search..................... 74/568 FS, 568 R

[56] References Cited
UNITED STATES PATENTS

| | | | |
|---|---|---|---|
| 855,773 | 6/1907 | Hanson............................ | 74/568 FS |
| 2,945,397 | 7/1960 | Caler et al...................... | 74/568 FS |
| 3,792,408 | 2/1974 | Gorgens et al. ............. | 74/568 FS X |
| 3,792,627 | 2/1974 | Tarello ........................... | 74/568 FS |

FOREIGN PATENTS OR APPLICATIONS

| | | | |
|---|---|---|---|
| 980,280 | 5/1951 | France............................ | 74/568 FS |
| 395,674 | 4/1932 | United Kingdom ............. | 74/568 FS |

*Primary Examiner*—Samuel Scott
*Assistant Examiner*—F. D. Shoemaker
*Attorney, Agent, or Firm*—Young & Thompson

[57] ABSTRACT

The invention relates to a variable-profile cam of the kind comprising a cam-surface formed by one of the longitudinal faces of a thin strip extending freely between at least two supports, of which at least one is adjustable transversely in position, in which the thin strip is made of an elastically-deformable material, and the transverse moment of inertia of the strip can vary between the two supports, for example by variation of the width or the thickness of the strip. The invention is particularly applicable to cams for reproducing machines for the production of aspherical surfaces of moulds for contact lenses.

21 Claims, 7 Drawing Figures

VARIABLE-PROFILE CAM, ESPECIALLY FOR A REPRODUCING MACHINE

The present invention relates generally to cams utilized in reproducing or copying machines for the guiding of a centre-punch which effects by any appropriate means, hydraulic, mechanical, pneumatic or the like, the displacement of a work-tool.

One of the problems which is encountered with such machines is to ensure their rapid adaptation to the reproduction of different surfaces.

This is the case especially with reproducing machines intended for the production of aspherical surfaces of the type associated with moulds used in the production of contact lenses.

In fact, to obtain moulds permitting the production of contact lenses having different geometrical characteristics, it is necessary to be able to modify the profile of the cam which pilots the reproducing machine employed.

For that purpose, it is possible to have available as many pilot cams of different profiles as there are types of surfaces to be obtained, and to equip the reproducing machine with the corresponding cam for each of these types of surfaces.

In addition to the fact that this solution necessitates the manufacture and storage of a large number of different cams, and is for this reason expensive, it necessitates at each time a relatively long and awkward mounting of the cam, taking account of the essential adjustments.

In order to overcome this drawback, it has already been proposed to utilize a cam with a variable profile or cam surface, such a cam comprising a cam surface formed by one of the longitudinal faces of a thin strip extending freely between at least two supports, of which at least one is adjustable in position transversely.

In cams of this type known at the present time, the strip forming such a cam is sufficiently thin to be applied transversely on the adjustable abutment fingers variable in position, and therefore to follow the profile imposed by these latter, even at the cost of a permanent deformation, which necessitates on the other hand a multiplication of such fingers adapted to prevent undesirable deformation of the strip between two of these fingers during the passage of the associated reproducing centre-punch.

Although such a cam with a variable profile may prove satisfactory, it thus makes necessary the provision of a large number of abutment fingers and therefore of relatively careful adjustments, each of these fingers being required to be regulated in position during a change of profile of the cam.

The present invention has for its object a cam with a variable profile which is not subject to this disadvantage.

The cam according to the invention is of the kind comprising a cam surface formed by one of the longitudinal faces of a thin strip extending freely between at least two supports, of which at least one is adjustable transversely in position and, according to a first aspect, is characterized in that the said strip is of elastically-deformable material, and in that its moment of inertia is variable between its supports.

It is an important fact that the thin strip constituting the cam according to the invention is of elastically deformable material, since it advantageously makes it possible to obtain, without exceeding the elastic limit of this material and with a small number of supporting points, a progressive, continuous and reversible modification of the profile of this cam.

At the same time, taking into account on the one hand the equation representing the elastic deformation and therefore the profile of the cam between its supports and further taking into account the law of variation of its transverse moment of inertia between these supports, it is possible to obtain for this profile the desired geometric equation, or a geometric law sufficiently close to this equation to be coincident therewith within the limits of the other inevitable tolerances of manufacture.

In practice, only two supports are necessary, one being a secured and the other a free support, to permit the production of a cam with a variable arcuate profile in accordance with the invention.

In fact, a cam of this kind forms in itself a built-in beam, and it is then only necessary for the variation according to the invention, of its transverse moment of inertia to be linear in order that the profile obtained may follow a geometric law of the second degree and may be considered to be a portion of a circle.

In addition to its simplicity of construction, the cam according to the invention has the advantage of being very easily and very rapidly modified in profile, since for that purpose it is only necessary to displace its free support or supports and that these latter should be always very limited in number.

Furthermore, it has been proved that a cam elastically-deformable between supports according to the invention can give rise to advantageous applications, even if its moment of inertia is constant, that is to say even if its transverse section is constant.

According to this aspect, the present invention has also for its object a cam with a variable profile, especially for a reproducing machine, of the kind comprising a cam surface formed by one of the longitudinal faces of a thin strip extending freely between two supports, of which at least one is adjustable transversely in position and characterized in that the supports of the thin strip constituting this surface are two in number and are arranged at the extremities of the said strip, the latter being free to be deformed elastically between the said supports during the displacement of that support which is adjustable or of both supports if both supports are adjustable, the final shape of the strip thus resulting only from its sole elastic deformation.

Furthermore, it is of course desirable that the ratio e/L between the thickness e of the thin strip which constitutes the cam according to the invention and the length L of this thin strip should be sufficiently high to avoid the reproduction punch intended to be applied against this cam giving rise to even an elastic deformation of the cam during its passage, and sufficiently low for this strip as a whole to be effectively capable of an elastic deformation, or in other words for the displacement of its mobile support to result in no permanent deformation.

In this respect, this ratio e/L is preferably between 0.001 and 0.2.

According to this aspect, the present invention has also for its object a cam with a variable profile, especially for a reproducing machine, of the kind comprising a cam surface formed by one of the longitudinal faces of a thin strip extending freely between two supports, at least one of which is adjustable transversely in position, and characterized in that the ratio e/L between the thickness of the thin strip of which it is formed and the length L of this strip between its supports, is between 0.001 and 0.2; the moment of inertia of the said strip may be constant or variable.

In practice, and in particular for reproducing machines intended to produce aspherical surfaces of the type comprised by moulds utilized for the production of contact lenses, it is advantageous for the thin strip forming the cam according to the invention to comprise a fixed portion held applied against a cylindrical supporting strap, with a circular profile for example of pre-determined radius, and a moving portion extending the fixed portion tangentially, the said moving portion having substantially a circular profile with a radius adjustable by deformation.

According to this aspect, the present invention has also for its object a cam with a variable profile, especially for a reproducing machine, of the kind comprising a cam surface formed by one of the longitudinal faces of a thin strip extending freely between two supports, of which at least one is adjustable transversely in position, and characterized in that the supports of the thin strip which forms the said surface are two in number and are arranged at the extremities of the said strip, this latter being free to be elastically deformed between the said supports during the displacement of that of these supports which is adjustable, or of its two supports if these are both adjustable, the final configuration of the strip thus resulting solely from its elastic deformation; the moment of inertia of the said strip may be constant or variable.

The objects, characteristic features and advantages of the invention will furthermore be brought out in the description which follows below, given by way of example, reference being made to the accompanying diagrammatic drawing, in which.

Figure 1:
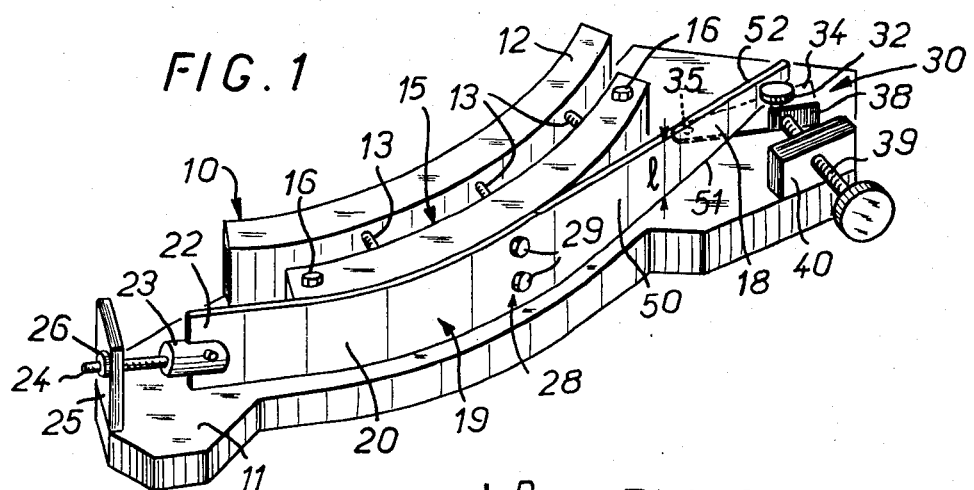
FIG. 1 is a perspective view of the assembly formed by the cam according to the invention and the frame on which it is carried.

These drawings illustrate the application of the invention to the production of a cam with a variable arcuate profile coupled tangentially to a pre-determined constant circular profile.

Such a cam is suitable for utilization in the reproducing machines employed for the cutting of aspherical moulds intended for the production of contact lenses.

The cam according to the invention is carried by a frame 10 formed mainly by a base- or sole-plate 11 and a ledge 12 which extends over a portion of a circle, substantially perpendicular to the sole-plate 11.

The ledge 12 is provided here and there transversely, that is to say radially, with fingers 13 which are mounted axially movable in holes drilled in the said ledge 12, and which can be locked axially in position with respect to this ledge.

These fingers may simply be constituted by screws engaged by screwing into tapped bores in the ledge 12 of the frame 10.

Facing the fingers 13, the frame 10 carries a rigid supporting member in the form of a strap 15 which is fixed on it, preferably in a removable manner, for example by means of screws 16.

The supporting strap extends over a portion of a circle coaxially with respect to the ledge 12 of the frame 10, and its outer surface forms a part of a cylinder of radius R and with a central plane of symmetry P.

The cam according to the invention is formed by the free bending span or section 18 of a thin strip 19 of elastically-deformable material, comprising in the example shown a fixed section 20 applied against a portion of the supporting strap 15.

In practice and as shown, this fixed section 20 comprises a free extremity 22 which is gripped in a tension fork 23 coupled to a threaded tie-rod 24 which is engaged by screwing into a square member 25 carried on the sole-plate 11 of the frame 10 in co-operation with a lock-nut 26.

The fixed section 20 of the strip 19 extends from this free extremity 22 to a fixed extremity 28 located, in the example shown, beyond the central plane of symmetry P of the supporting strap 15, and fixed by screws 29 which apply the strip 19 rigidly against the said supporting strap 15.

These screws 29 form a fixing point for the free section 18 of the strip 19, and in the example shown, this latter extends freely from this fixing point to a free support 30 close to its free extremity 31.

In practice and as shown, the strip 19 is therefore only in contact with the supporting strap 15 beyond its fixing point 28 with respect to its free support 30, and on the contrary extends freely from this fixing point to this free support; its outer longitudinal face 50 forms an arcuate cam surface for a reproduction feeler of any kind (not shown).

Preferably and as shown, the free support 30 is formed by a cylindrical roller 32 held applied in contact with the longitudinal face 50 of the strip 19.

This roller 32 is rotatably mounted about a shaft 33 carried by an arm 34 pivotally mounted in turn on the sole-plate 11 of the frame 10 about a shaft 35 parallel to the shaft 33 of the roller 32, the shafts 33 and 35 in question being parallel to the generator lines of the longitudinal face 50 of the strip 19.

The arm 34 which carries the roller 32 also carries an angle member 38 and is subjected by this latter to the actuation of an adjusting finger 39 which bears against the angle member 38 and which is movably-mounted axially and lockable axially in an angle member 40 carried for that purpose by the sole-plate 11 of the frame 10.

This transverse adjusting finger 39 may be constituted simply by a screw.

According to a characteristic aspect of the form of the invention shown, the transverse moment of inertia of the strip 19, and more precisely of its free section 18 intended to form a variable profile cam, varies between the fixing screws 29 and the free support 30 between which this free section 18 extends.

Preferably and as shown, the thickness e of the strip 19 is constant and its width or height l decreases linearly starting from the fixing screws 29.

In the form of embodiment shown, the lower edge 51 of the free section 18 of the strip 19 is rectilinear, and is located in the extension of the corresponding edge of the fixed section 20 of this strip, whereas the upper edge 52 of the free section 18, although rectilinear like the corresponding edge of the fixed section 20, is skewed with respect to this latter, so that the said free section 18 has generally a trapezoidal shape, tapering in the direction of its free extremity.

The free section 18 of the strip 19 forms a fixed end beam, and its transverse moment of inertia varying in a substantially linear manner from its fixing point to its free support, its profile corresponds to an equation of the second degree, comparable with that of a circle of radius R′. The fixing point of the free section 18 of the strip 19 being spaced away from the central plane of symmetry of the supporting strap 15, the centre of the circle of radius R′ formed by its profile is also spaced away from this plane.

Thus the strip 19 comprises successively a fixed section 20 forming a cylindrical surface of radius R and a variable section 18 forming a substantially cylindrical surface of radius R′, these two cylindrical surfaces being coupled together tangentially at the level of the fixing screws 29 common to the said sections.

These cylindrical surfaces conjointly form the cam surface 50 in contact with which is applied the associated reproduction punch or feeler.

The thickness $e$ of the strip 19 forming the cam according to the invention is chosen sufficient, taking account of the length L of the free section of the strip at its supports 29 and 30, for the reproduction feeler to follow this free section without giving it any undesirable deformation.

In practice, in this respect, a suitable ratio e/L is at least equal to 0.001; furthermore, this ratio e/L must be at most equal to 0.2 in order to limit the risk of permanent deformation.

In order to modify the radius R′ of the free section 18 of the strip 19, it is only necessary to act on the centre-punch screw forming the adjusting finger 39 which acts on this section.

Figure 2:
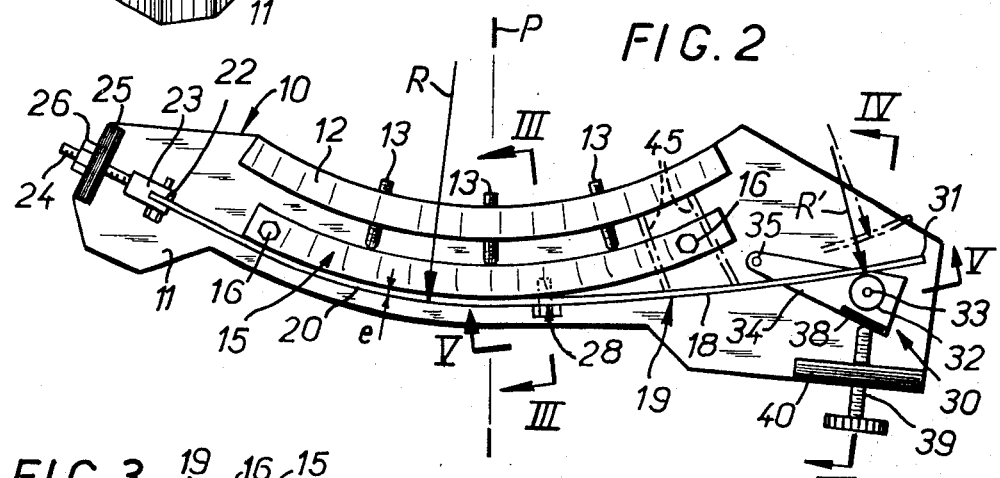
FIG. 2 is a plan view of this assembly.
Figure 3:
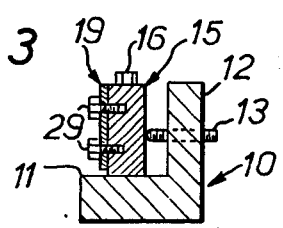
FIGS. 3, 4 and 5 are views in cross-section taken respectively along the lines III—III, IV—IV and V—V of FIG. 2.
Figure 4:
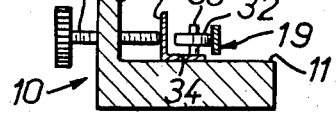
Figure 5:
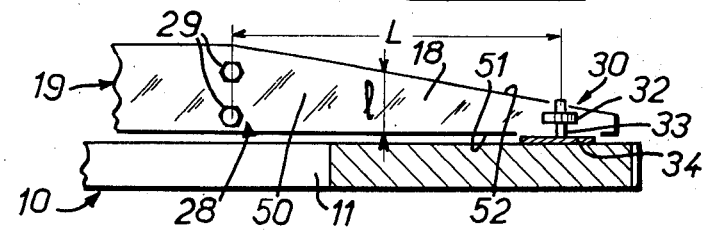

However, in the case where this may be necessary, the supporting strap 15 may be provided transversely and in an adjustable manner with fingers 45 intended to abut against the free section 18 of the strip 19 between the fixing screws 29 and the free support 30 of this section, as shown in broken lines in FIG. 2.

Figure 6:
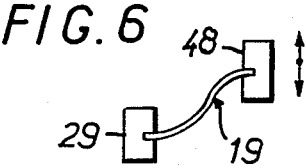
FIG. 6 is a diagrammatic view in plan of an alternative form of construction.

According to the alternative form of construction shown in FIG. 6, which enables a particular variable profile to be obtained, the strip 19 is arranged between two fixing points 29 and 48, the fixing point 29 being fixed as previously, while the point 48 is adjustable transversely in position.

Figure 7:
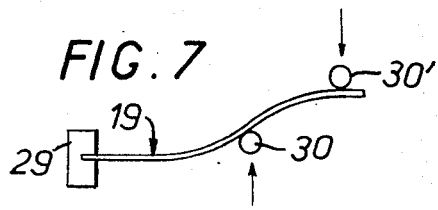
FIG. 7 is a view similar to FIG. 6 and relates to another alternative form of construction.

According to another alternative shown in FIG. 7, the strip 19 extends between a fixing point 29 and two free supports 30, 30′, displaced longitudinally along the strip 19, these free supports being arranged alternately on each side of the strip, and at least one of them being adjustable transversely in position.

In all cases, the transverse moment of inertia of the strip 19, measured from its fixing point, is preferably variable in a continuous or non-continuous manner, increasing or decreasing. For certain applications however, as already explained above, this moment of inertia may be constant.

In all cases also, the strip 19 may be made up of any material having suitable elastic characteristics, steel or similar metal, or synthetic material for example.

Finally, in all cases, it may be desirable to immobilize, at least momentarily, the configuration of the cam according to the invention, by associating with it abutment means such as a casting of hardenable material, a metal with a low melting point for example, applied to its back surface.

It will of course be understood that the present invention is not restricted to the forms of embodiment described and shown, but covers any alternative form of construction and/or combination of their various parts.

In particular, the width or height of the elastically-deformable strip constituting the cam according to the invention may be constant, its width $e$ then being variable. According to another alternative, the thickness $e$ and the width $l$ may vary conjointly.

What I claim is:

1. A variable profile cam for a machine tool comprising a thin resilient strip having two longitudinal faces, one of the two longitudinal faces of said strip defining a cam surface, two spaced apart support means for supporting a span of said strip for bending therebetween, means for varying the curvature of the strip including adjustment means associated with at least one of said support means for bending said strip elastically generally perpendicularly to its two longitudinal faces, the transverse moment of inertia of the span of said strip being varying lengthwise of said strip intermediate said support means, whereby the curvature of said strip may be adjusted by said adjustment means for determining the profile of said cam surface as desired.

2. A variable profile cam according to claim 1, wherein at least one of said support means is a fixed end support member preventing bending of said strip thereat.

3. A variable profile cam according to claim 2, wherein the other said support means is an abutment allowing free deflection of said strip thereat, and wherein said adjustment means is associated with said other support means.

4. A variable profile cam according to claim 2, wherein said adjustment means is associated with said fixed end support.

5. A variable profile cam according to claim 1, wherein there is a third support means, and wherein two of said support means are disposed respectively on opposite faces of said strip, along said span.

6. A variable profile cam according to claim 3, wherein said abutment is disposed adjacent a free end of said strip.

7. A variable profile cam according to claim 3, wherein said abutment is a cylindrical roller bearing against one longitudinal face of said strip.

8. A variable profile cam according to claim 7, wherein said roller is mounted for rotation about an axis which is parallel to said longitudinal faces of said strip and bears against said cam surface transversely.

9. A variable profile cam according to claim 7, wherein said adjustment means comprises an arm pivotally mounted about an axis parallel to said longitudinal faces of said strip, said roller being carried on said arm, and a transverse adjustment member engageable with said arm, axially displaceable and lockable in axial position.

10. A variable profile cam according to claim 1, wherein one of said support means is a fixed end support member preventing bending of said strip thereat, and the other of said support means is an abutment allowing free deflection of said strip thereat.

11. A cam according to claim 2, further comprising a part-cylindrical supporting member, and wherein said strip is applied against said part-cylindrical supporting member beyond said fixed end support member with regards to said span.

12. A cam according to claim 11, wherein said supporting member is removably mounted on a frame.

13. A cam according to claim 12, further comprising axially displaceable pins mounted on said frame lockable in position and in abutment against said supporting member.

14. A cam according to claim 12, further comprising axially adjustable pins mounted on said supporting member and in abutment against one of the longitudinal faces of said span of said strip.

15. A cam according to claim 1, wherein the width of said span of said strip measured transversely of said longitudinal faces is variable between said support means and the thickness $e$ of said span of said strip measured between said longitudinal faces is substantially constant, thereby providing the variable transverse moment of inertia of said span.

16. A cam according to claim 15, wherein the width $l$ of said span of said strip varies linearly between said support means.

17. A cam according to claim 16, wherein the width $l$ of said span of said strip decreases linearly from said fixed end support member towards said abutment.

18. A cam according to claim 17, wherein the ratio of the thickness $e$ of said span of said strip to the longitudinal length L thereof measured between said support means is between 0.001 and 0.2.

19. A cam according to claim 1, wherein the width $l$ of said span of said strip measured transversely of longitudinal faces of said span of said strip is constant and the thickness $e$ of said span of said strip measured between said longitudinal faces is variable, thereby providing, the variable transverse moment of inertia of said span of said strip.

20. A cam according to claim 11, wherein said span of said strip is free to bend between said support means whereas the part of said strip beyond said span is maintained in fixed position against said part-cylindrical supporting means.

21. A cam according to claim 1, further comprising abutment means associated with said strip, bearing against the longitudinal face of said span opposite said cam surface thereby fixing the configuration of the profile of said cam surface.

* * * * *